United States Patent
Fuller et al.

(10) Patent No.: US 7,976,730 B2
(45) Date of Patent: Jul. 12, 2011

(54) BLENDS OF LOW EQUIVALENT MOLECULAR WEIGHT PFSA IONOMERS WITH KYNAR 2751

(75) Inventors: Timothy J. Fuller, Pittsford, NY (US); Sean M MacKinnon, Fairport, NY (US); Michael R. Schoeneweiss, W. Henrietta, NY (US); Craig S. Gittleman, Rochester, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 270 days.

(21) Appl. No.: 12/197,870

(22) Filed: Aug. 25, 2008

(65) Prior Publication Data

US 2010/0044616 A1   Feb. 25, 2010

(51) Int. Cl.
*H01B 1/00* (2006.01)
*H01M 8/10* (2006.01)
*B01J 49/00* (2006.01)
*C08L 27/12* (2006.01)

(52) U.S. Cl. ........... 252/500; 429/494; 521/25; 525/199
(58) Field of Classification Search .................. 252/500; 429/494; 521/25; 525/199
See application file for complete search history.

(56) References Cited

U.S. PATENT DOCUMENTS

| | | | |
|---|---|---|---|
| 5,021,602 A | 6/1991 | Clement et al. | |
| 5,037,917 A | 8/1991 | Babb et al. | |
| 5,066,746 A | 11/1991 | Clement et al. | |
| 5,159,037 A | 10/1992 | Clement et al. | |
| 5,159,038 A | 10/1992 | Babb et al. | |
| 5,316,871 A | 5/1994 | Swathirajan et al. | |
| 5,910,378 A | 6/1999 | Debe et al. | |
| 6,124,060 A | 9/2000 | Akita et al. | |
| 6,183,668 B1 | 2/2001 | Debe et al. | |
| 6,277,512 B1 * | 8/2001 | Hamrock et al. | 429/492 |
| 6,384,167 B2 | 5/2002 | DesMarteau et al. | |
| 6,444,343 B1 | 9/2002 | Prakash et al. | |
| 6,521,381 B1 | 2/2003 | Vyas et al. | |
| 6,523,699 B1 | 2/2003 | Akita et al. | |
| 6,559,237 B1 | 5/2003 | Mao et al. | |
| 6,670,065 B2 | 12/2003 | Koyama et al. | |
| 6,847,518 B2 | 1/2005 | Fukuda et al. | |
| 6,875,537 B2 | 4/2005 | Tani et al. | |
| 6,926,984 B2 | 8/2005 | Asano et al. | |
| 6,933,068 B2 | 8/2005 | Asano et al. | |
| 6,953,653 B2 | 10/2005 | Smith et al. | |
| 6,986,962 B2 | 1/2006 | Oyanagi et al. | |
| 7,001,929 B2 | 2/2006 | Goto et al. | |

(Continued)

FOREIGN PATENT DOCUMENTS

JP   2003535929 T   12/2003

(Continued)

OTHER PUBLICATIONS

"Nafion perfluorinated resin," Slgma-Aldrich Online Catalog http://www.sigmaaldrich.com/catalog/ProductDetail.do?lang=en&N4=495786|ALDRICH&N5=SEARCH_CONCAT_PNO|BRAND_KEY&F=SPEC.*

(Continued)

*Primary Examiner* — Mark Kopec
*Assistant Examiner* — Jaison P Thomas
(74) *Attorney, Agent, or Firm* — Brooks Kushman P.C.

(57) ABSTRACT

A polymer blend useful as an ion conductor in fuel cells includes a first polymer that includes a non-ionic segment and a second polymer that includes a sulfonic acid group.

16 Claims, 3 Drawing Sheets

U.S. PATENT DOCUMENTS

| | | | |
|---|---|---|---|
| 7,045,241 B2 | 5/2006 | Akita et al. | |
| 7,094,851 B2 | 8/2006 | Wu et al. | |
| 2001/0018144 A1 | 8/2001 | Watakabe et al. | |
| 2002/0014405 A1* | 2/2002 | Arcella et al. | 204/296 |
| 2003/0017379 A1* | 1/2003 | Menashi | 429/44 |
| 2003/0096149 A1 | 5/2003 | Koyama et al. | |
| 2003/0180596 A1 | 9/2003 | Yoshimura et al. | |
| 2004/0214058 A1 | 10/2004 | Tada et al. | |
| 2004/0214065 A1 | 10/2004 | Kanaoka et al. | |
| 2005/0014927 A1 | 1/2005 | Akita | |
| 2005/0043487 A1* | 2/2005 | Felix et al. | 525/199 |
| 2005/0048342 A1 | 3/2005 | Wakahoi et al. | |
| 2005/0053810 A1 | 3/2005 | Kato et al. | |
| 2005/0058864 A1 | 3/2005 | Goebel | |
| 2005/0064260 A1 | 3/2005 | Otsuki et al. | |
| 2005/0074651 A1* | 4/2005 | Kidai et al. | 429/30 |
| 2005/0100770 A1 | 5/2005 | Sugawara et al. | |
| 2005/0106440 A1 | 5/2005 | Komiya | |
| 2005/0116206 A1 | 6/2005 | Kakuta et al. | |
| 2005/0130024 A1 | 6/2005 | Otsuki et al. | |
| 2005/0142397 A1 | 6/2005 | Wakahoi et al. | |
| 2005/0143530 A1 | 6/2005 | Iwadate et al. | |
| 2005/0175886 A1 | 8/2005 | Fukuda et al. | |
| 2005/0197467 A1 | 9/2005 | Komiya et al. | |
| 2005/0227138 A1 | 10/2005 | Fukuda et al. | |
| 2005/0233181 A1 | 10/2005 | Wariishi et al. | |
| 2005/0260474 A1 | 11/2005 | Asano et al. | |
| 2006/0019147 A1 | 1/2006 | Fukuda et al. | |
| 2006/0127728 A1 | 6/2006 | Otsuki et al. | |
| 2006/0177719 A1* | 8/2006 | Fuller et al. | 429/33 |
| 2007/0042242 A1 | 2/2007 | Tada et al. | |
| 2007/0099054 A1 | 5/2007 | Fuller et al. | |
| 2007/0141237 A1 | 6/2007 | Okiyama et al. | |
| 2009/0278083 A1* | 11/2009 | Fuller et al. | 252/182.1 |

FOREIGN PATENT DOCUMENTS

| | | |
|---|---|---|
| JP | 2005129298 A | 5/2005 |
| JP | 2005166557 A | 6/2005 |
| JP | 2005179380 A | 7/2005 |
| JP | 2009249487 A | 10/2009 |
| WO | 2004/051776 | 6/2004 |
| WO | 2007/052954 A1 | 5/2007 |

OTHER PUBLICATIONS

"Fluorel Techinical Data Sheets," MatWeb Material Property Data website http://www.matweb.com/search/GetMatIsByTradename.aspx?navletter=F&tn=Fluorel%E2%84%A2.*

Budy, S.M. et al., "Facile preparation of fluorovinylene aryl ether telechelic polymers with dual functionality for thermal chain extension and tandem crossliking," Chem. Commun. 2006, pp. 4844-4846, 2006.

Li, Z. et al., A Novel Bisphenol Monomer with Grafting Capability and the Resulting Poly(arylene ether sulfone)s, Macromolecules 2006, 39, pp. 6990-6996.

Matsumura, S. et al., Iononners for Proton Exchange Membrane Fuel Cells with Sulfonic Acid Groups on the End Groups: Novel Branched Poly(eteher-ketone)s, Macromolecules 2008, 41, pp. 281-284.

Smith, D.W. et al., "Perfluorocyclobutane Aromatic Polyethers. Synthesis and Characterization of New Siloxane-Containing Fluoropolymers," Macromolecules 1996, v. 29, pp. 852-860.

Smith, D.W. et al., "Perfluorocyclobutane (PFCB) polyaryl ethers: versatile coatings material," J. of Fluorine Chem., v. 104, pp. 109-117 (2000).

Souzy, R. et al., "Functional fluoropolymers for fuel cell membranes," Solid State Ionics, v. 176, pp. 2839-2848 (2005).

Souzy, R. et al., "Functional fluoropolymers for fuel cell membranes," Prog. Polm. Sci. 30, 2005, pp. 644-687.

"Fluorel Technical Data Sheets," MatWeb Material Property Data website, http://www.matweb.com/search/GetMatIsByTradename.aspx?navletter=F&tn=Fluorel%E2%84%A2.

Nafion perfluorinated resin, Sigma-Aldrich Online Catalog, http://www.sigmaaldrich.com/catalog/ProductDetail.do?lang=en&N4=495786|ALDRICH&N5=SEARCH_CONCAT_PNO|BRAND_KEY&F=SPEC.

Ford, L.A. et al., "New Aromatic Perfluorovinyl Ether Monomers Containing the Sulfonimide Acid Functionality," Polymeric Materials Science & Eng., v. 83, 2000, pp. 10-11 (American Chemical Society).

Souzy, R. et al., "Synthesis and (co)polymerization of monofluoro, difluoro, trifluorostyrene and ((trifluorovinyl)oxy) benzene," Prog. Polm. Sci. 29 (2004), pp. 75-106.

* cited by examiner

BLENDS OF LOW EQUIVALENT MOLECULAR WEIGHT PFSA IONOMERS WITH KYNAR 2751

TECHNICAL FIELD

The field to which the disclosure generally relates includes polymer electrolyte and fuel cells.

BACKGROUND

Polymer electrolytes play an important part in electrochemical devices such as batteries and fuel cells. To achieve optimal performance, the polymer electrolyte must maintain a high ionic conductivity and mechanical stability at both high and low relative humidity. The polymer electrolyte also needs to have excellent chemical stability for long product life and mechanical robustness. Fluorinated copolymers have been explored as electrolytes for fuel cells. Due to their inherent chain configuration, however, low equivalent weight fluorinated copolymers typically suffer from water swelling at high humidity and excess membrane shrinkage at low humidity. A low equivalent weight fluorinated random copolymer membrane lacks the mechanical robustness to withstand the rigors of hydration and dehydration within an operating fuel cell. Thus, there is a need for an improved polymer electrolyte that maintains robust mechanical properties and high ionic conductivity at wide range of humidity conditions.

Accordingly, an improved polymer electrolyte molecular architecture and a process of synthesizing such a polymer electrolyte are desired.

SUMMARY OF THE INVENTION

The present invention solves one or more problems of the prior art by providing in at least one embodiment a polymer blend including a first polymer that includes a non-ionic polymer segment and a second polymer having the following chemical moiety:

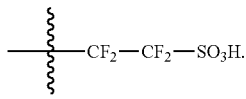

Advantageously, the polymer blends provide improved fuel cell performance at lower cost, reduced water volume swells in boiling water, improved elasticity, mechanical properties and durability, and reduced reactant gas cross-over. In addition, the blends allow thin membranes to be cast with improved ease of handling. Moreover, the need for ePTFE support structures is eliminated. Finally, the blends of the present embodiment cast from dimethylacetamide allow membrane formation without an annealing step at 140° C. as required for membranes cast from aqueous alcohol.

Other exemplary embodiments of the invention will become apparent from the detailed description provided hereinafter. It should be understood that the detailed description and specific examples, while disclosing exemplary embodiments of the invention, are intended for purposes of illustration only and are not intended to limit the scope of the invention.

BRIEF DESCRIPTION OF THE DRAWINGS

Exemplary embodiments of the present invention will become more fully understood from the detailed description and the accompanying drawings, wherein.

DETAILED DESCRIPTION OF THE PREFERRED EMBODIMENT(S)

Figure 1:
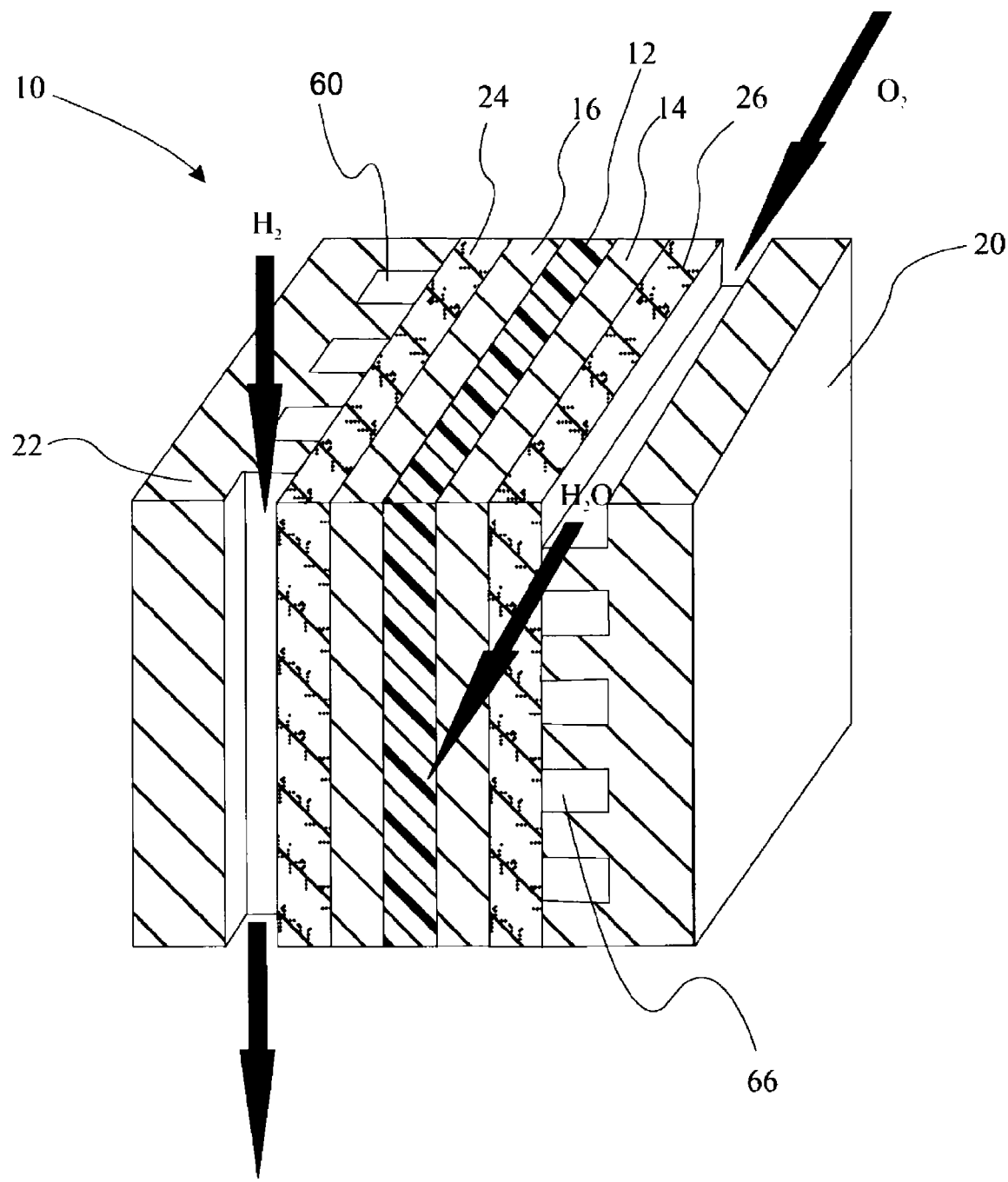
FIG. 1 provides a schematic illustration of a fuel cell incorporating the polymers of an embodiment of the present invention.

Reference will now be made in detail to presently preferred compositions, embodiments and methods of the present invention, which constitute the best modes of practicing the invention presently known to the inventors. The Figures are not necessarily to scale. However, it is to be understood that the disclosed embodiments are merely exemplary of the invention that may be embodied in various and alternative forms. Therefore, specific details disclosed herein are not to be interpreted as limiting, but merely as a representative basis for any aspect of the invention and/or as a representative basis for teaching one skilled in the art to variously employ the present invention.

Except in the examples, or where otherwise expressly indicated, all numerical quantities in this description indicating amounts of material or conditions of reaction and/or use are to be understood as modified by the word "about" in describing the broadest scope of the invention. Practice within the numerical limits stated is generally preferred. Also, unless expressly stated to the contrary: percent, "parts of," and ratio values are by weight; the term "polymer" includes "oligomer," "copolymer," "terpolymer," and the like; the description of a group or class of materials as suitable or preferred for a given purpose in connection with the invention implies that mixtures of any two or more of the members of the group or class are equally suitable or preferred; description of constituents in chemical terms refers to the constituents at the time of addition to any combination specified in the description, and does not necessarily preclude chemical interactions among the constituents of a mixture once mixed; the first definition of an acronym or other abbreviation applies to all subsequent uses herein of the same abbreviation and applies mutatis mutandis to normal grammatical variations of the initially defined abbreviation; and, unless expressly stated to the contrary, measurement of a property is determined by the same technique as previously or later referenced for the same property.

It is also to be understood that this invention is not limited to the specific embodiments and methods described below, as specific components and/or conditions may, of course, vary. Furthermore, the terminology used herein is used only for the purpose of describing particular embodiments of the present invention and is not intended to be limiting in any way.

It must also be noted that, as used in the specification and the appended claims, the singular form "a," "an," and "the" comprise plural referents unless the context clearly indicates otherwise. For example, reference to a component in the singular is intended to comprise a plurality of components.

Throughout this application, where publications are referenced, the disclosures of these publications in their entireties are hereby incorporated by reference into this application to more fully describe the state of the art to which this invention pertains.

With reference to FIGS. 1, a fuel cell that incorporates a polymer electrolyte including polymers from the invention is provided. PEM fuel cell 10 includes polymeric ion conductive membrane 12 disposed between cathode catalyst layer 14 and anode catalyst layer 16. Polymeric ion conductive membrane 12 includes one or more of the polymers set forth below. Fuel cell 10 also includes conductive plates 20, 22, gas channels 60 and 66, and gas diffusion layers 24 and 26.

In an embodiment of the present invention, a polymer blend includes a first polymer having a non-ionic polymer segment and second polymer having the following chemical moiety:

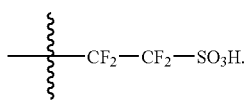

In a variation, the first polymer is a non-ionic polymer.

In a variation of an exemplary embodiment, the polymer blend further includes a non-ionic polymer such as a fluoroelastomer. The fluoroelastomer may be any elastomeric material comprising fluorine atoms. The fluoro-elastomer may comprise a fluoropolymer having a glass transition temperature below about 25° C. or preferably, below 0° C. The fluoro-elastomer may exhibit an elongation at break in a tensile mode of at least 50% or preferably at least 100% at room temperature. The fluoro-elastomer is generally hydrophobic and substantially free of ionic groups. The fluoro-elastomer polymer chain may have favorable interaction with the hydrophobic domain of the second polymer described above. Such favorable interaction may facilitate formation of a stable, uniform and intimate blend of the two materials. The fluoro-elastomer may be prepared by polymerizing at least one fluoro-monomer such as vinylidene fluoride, tetrafluoroethylene, hexafluoropropylene, vinylfluoride, chlorotrifluoroethylene, perfluoromethylvinyl ether, and trifluoroethylene. The fluoro-elastomer may also be prepared by copolymerizing at least one fluoro-monomer and at least one non-fluoro-monomer such as ethylene, propylene, methyl methacrylate, ethyl acrylate, styrene, vinylchloride and the like. The fluoro-elastomer may be prepared by free radical polymerization or anionic polymerization in bulk, emulsion, suspension and solution. Examples of fluoro-elastomers include poly(tetrafluoroethlyene-co-ethylene), poly(vinylidene fluoride-co-hexafluoropropylene), poly(tetrafluoroethylene-co-propylene), terpolymer of vinylidene fluoride, hexafluoropropylene and tetrafluoroethylene, and terpolymer of ethylene, tetrafluoroethylene and perfluoromethylvinylether. Some of the fluoro-elastomers are commercially available from Arkema under trade name Kynar Flex and Solvay Solexis under the trade name Technoflon®, from 3M under the trade name Dyneon®, and from DuPont under the trade name Viton®. For example, Kynar Flex 2751 is a copolymer of vinylidene fluoride and hexafluoropropylene with a melting temperature between about 130° C. and 140° C. The glass transition temperature of Kynar Flex 2751 is about −40 to −44° C. The fluoro-elastomer may further comprise a curing agent to allow crosslinking reaction after blended with the second polymer.

In another exemplary embodiment, the second polymer is a perfluorosulfonic acid polymer (PFSA). In a refinement, the second polymer is a copolymer containing repeating units based on tetrafluoroethylene and repeating units represented by $(CF_2\text{---}CF)\text{---}(OCF_2CFX)_m\text{---}O_p\text{---}(CF_2)_n\text{---}SO_3H$, where X represents a fluorine atom or a trifluoromethyl group, m represents an integer from 0 to 3, n represents an integer from 1 to 12 and p represents an integer of 0 or 1. Specifically, the first example would be represented by $m=1$, $X=CF_3$, $p=1$, $n=2$; the second example would be represented by $m=0$, $p=1$, $n=2$ and the third example would be represented by $m=0$, $p=1$, $n=4$.

In a further refinement, the second polymer is selected from the group consisting:

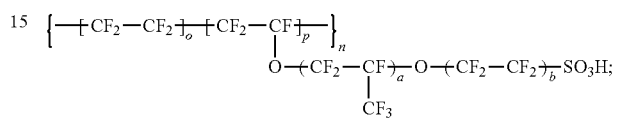

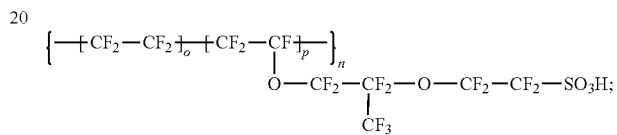

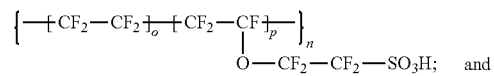

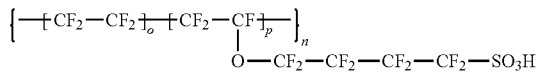

where o, p, n, are integers such that there are less than 15 o segments for each p segment.

In another refinement, the second polymer includes at least one of the following polymer segments:

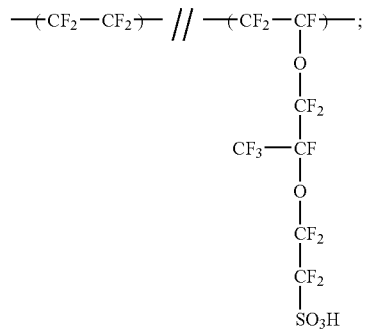

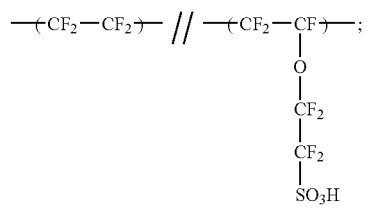

-continued

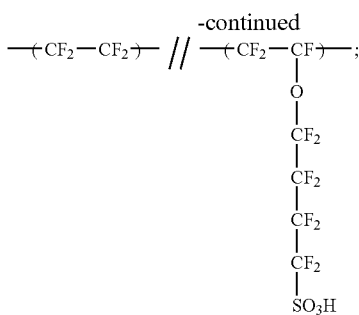

In one refinement, the first polymer is present in an amount from about 1 to about 80 weight percent of the total weight of the polymer blend. In another refinement, the first polymer is present in an amount from about 5 to about 50 weight percent of the total weight of the polymer blend. In another refinement, the first polymer is present in an amount from about 10 to about 30 weight percent of the total weight of the polymer blend. In another refinement, the second polymer is present in an amount from about 20 to about 99 weight percent of the total weight of the polymer blend. In still another refinement, the second polymer is present in an amount from about 50 to about 95 weight percent of the total weight of the polymer blend. In still another refinement, the second polymer is present in an amount from about 30 to about 90 weight percent of the total weight of the polymer blend.

The following examples illustrate the various embodiments of the present invention. Those skilled in the art will recognize many variations that are within the spirit of the present invention and scope of the claims.

Figure 2:
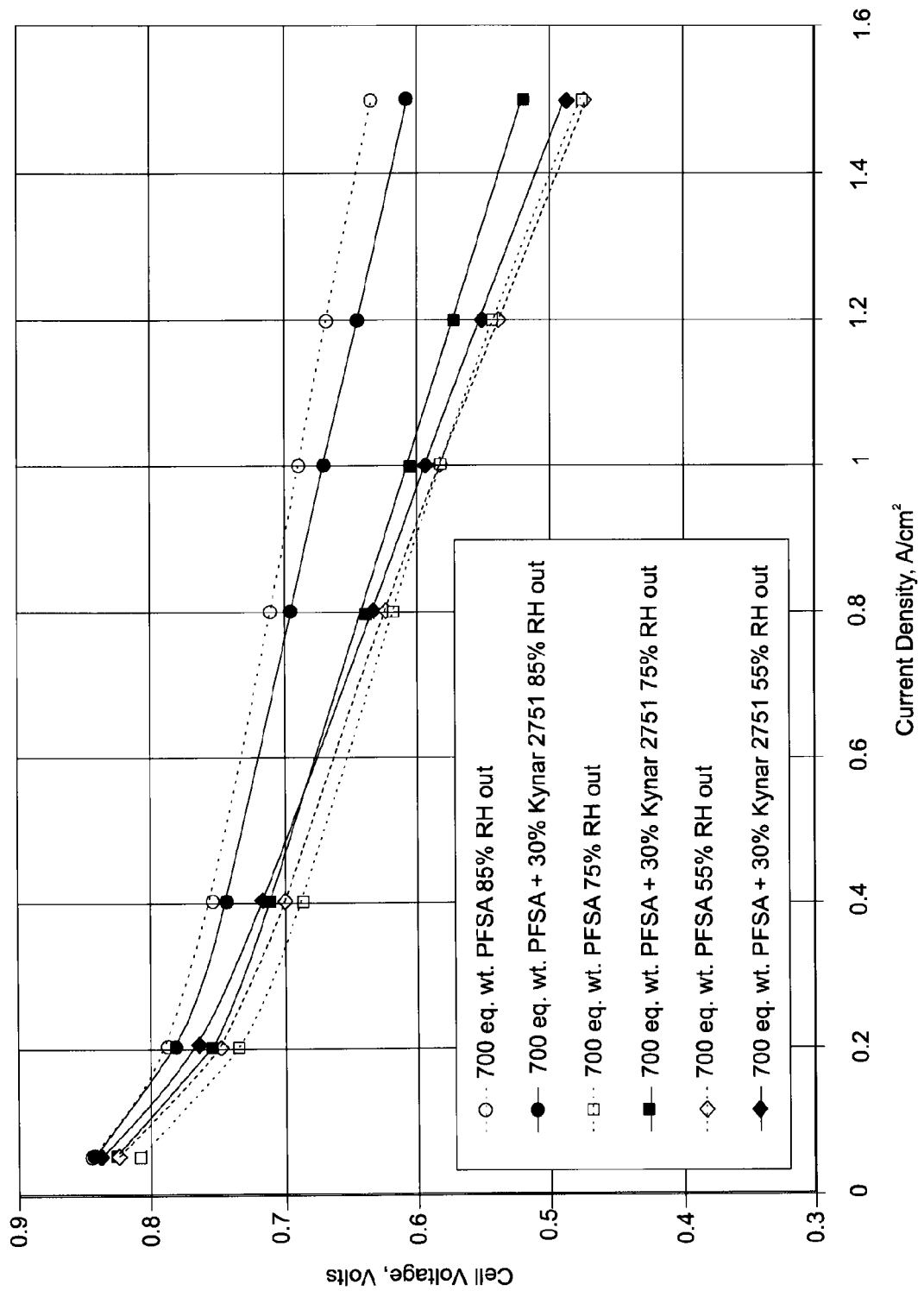
FIG. 2 provide plots of cell voltage versus current density of 700-Equivalent Weight Perfluorosulfonic Acid Polymer with and without Kynar Flex 2751 at 75% and 85% Relative Humidity ("RH") Outlet Gas Streams at 80° C. and 55% RH Outlet Gas Stream at 95° C.
Figure 3:
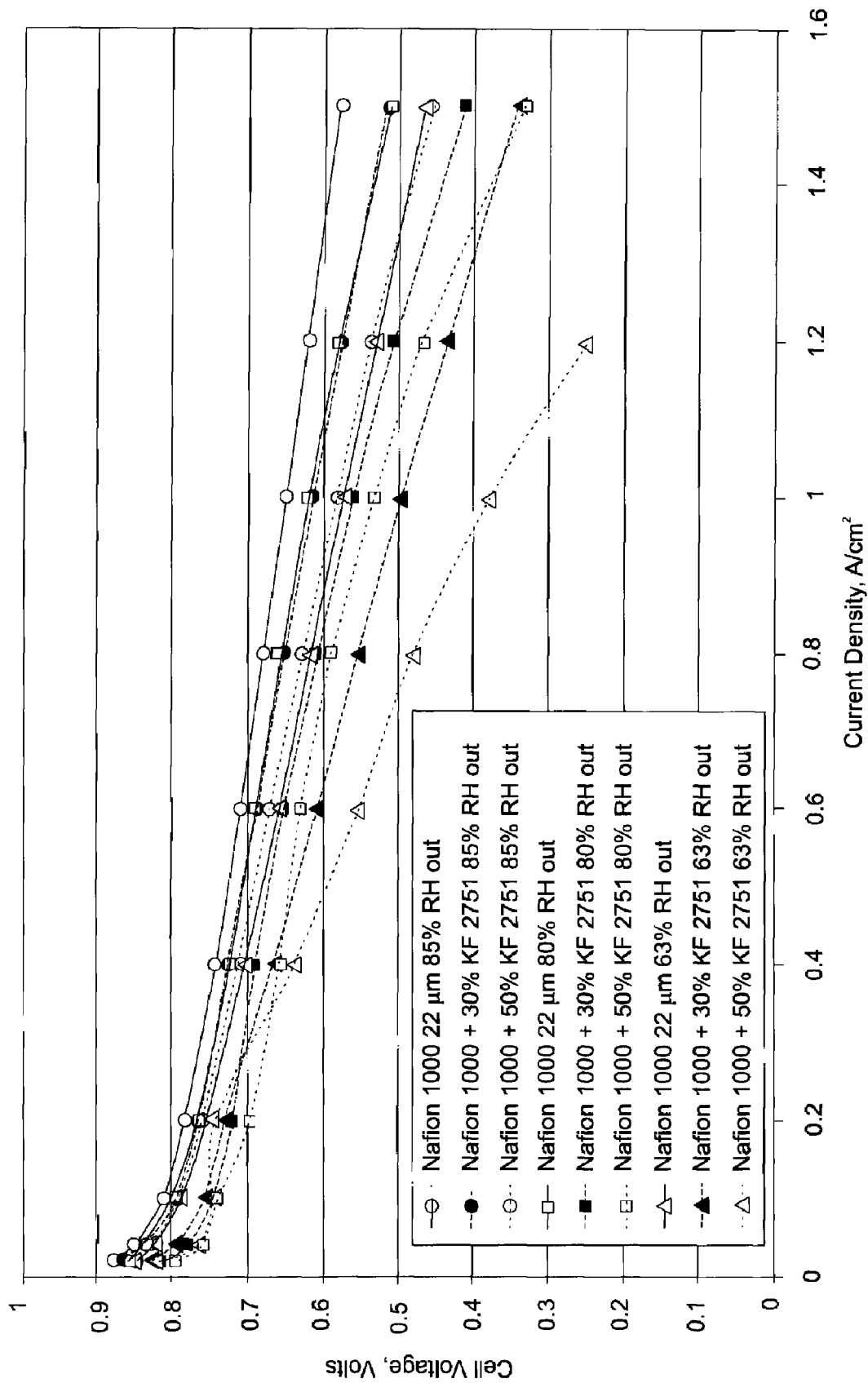
FIG. 3 provides plots of cell voltage versus current density of Nafion 1000 membrane alone and blended with 30 and 50 weight percent Kynar Flex 2751 at 85, 80 and 63% relative humidity outlet streams at 80° C.

Blends of PFSA polymers with polyvinylidene fluoride (PVDF2, Kynar) are solution coated from N,N-dimethylacetamide (DMAc) to form polyelectrolyte membranes at temperatures of between 80° C. and about 95° C. As set forth in FIGS. 2 and 3, these membranes exhibit low relative humidity performance that is nearly comparable to that of PFSA membranes alone. FIG. 2 provides plots of cell voltage versus current density of 700-equivalent weight perfluorosulfonic acid polymer blended with and without Kynar Flex 2751 at 75% and 85% relative humidity outlet gas streams at a temperature of 80° C. and 55% relative humidity outlet gas stream at a temperature of 95° C. FIG. 3 provides cell voltage versus current density of Nafion 1000 membrane alone and blended with 30 and 50 weight percent Kynar Flex 2751 at 85, 80 and 63% relative humidity outlet streams at 80° C. The membranes made of 700 equivalent weight PFSA blended with 30 weight percent Kynar Flex 2751 are solution coated from N,N-dimethylacetamide and then dried at 80° C. for 15 minutes. No subsequent annealing step is required as is the case with the PFSA membranes coated from aqueous alcohol solutions, which can require extended heating of, for example, 4 hours at 140° C. before the membranes maintain their integrity in water. The membrane made with 700 equivalent weight PFSA and 30 wt. % Kynar Flex 2751 withstand at least 20,000 cycles between 0% relative humidity (2 minutes) and 150% relative humidity (2 minutes) at 80° C. without a gas leak exceeding 10 standard cubic centimeters per minute. This represents a four times increase in mechanical durability over that of the same PFSA without any Kynar Flex 2751. Such mechanical durability over a broad range of relative humidity is required of membranes for automotive applications. The PFSA membrane with 30 weight percent Kynar Flex 2751 has a low boiling water uptake, that is: 48.5 weight percent (149 volume percent) for the 30% Kynar Flex blended membrane versus 115 weight percent (218 volume percent) for a membrane of the same 700 equivalent weight ionomer without Kynar Flex 2751. Thin membranes can be coated and easily handled without support structures such as expanded polytetrafluoroethylene. The Kynar blended membrane has a slightly lower oxygen gas crossover compared with that of the PFSA membrane alone while the hydrogen crossover is nearly the same for the membranes with and without Kynar Flex 2751. All these advantages in mechanical durability are observed without any significant loss in performance under dry humidity fuel cell operating conditions.

The above description of embodiments of the invention is merely exemplary in nature and, thus, variations thereof are not to be regarded as a departure from the spirit and scope of the invention.

What is claimed is:
1. A polymer blend comprising:
a first polymer including a nonionic polymer segment, the first polymer being a fluoroelastomer that is prepared by copolymerizing at least one fluoro-monomer and at least one non-fluoro-monomer wherein the fluoroelastomer has a glass transition temperature below about 25° C.; and
a second polymer having the following chemical moiety:

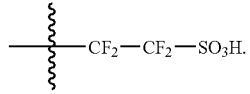

2. The polymer blend of claim 1 wherein the first polymer exhibits an elongation at break in a tensile mode of at least 50%.
3. The polymer blend of claim 1 wherein the fluoro-elastomer is be prepared by polymerizing at least one fluoro-monomer selected from the group consisting of vinylidene fluoride, tetrafluoroethylene, hexafluoropropylene, vinylfluoride, chlorotrifluoroethylene, perfluorovinylmethyl ether, and trifluoroethylene.
4. The polymer blend of claim 1 wherein the non-fluoro monomer is selected from the group consisting of ethylene, propylene, methyl methacrylate, ethyl acrylate, styrene, vinyl chloride and combinations thereof.
5. The polymer blend of claim 1 wherein the fluoro-elastomer is selected from the group consisting of poly(tetrafluoroethlyene-co-ethylene), poly(tetrafluoroethylene-co-propylene), and terpolymer of ethylene, tetrafluoroethylene and perfluoromethylvinylether.
6. The polymer blend of claim 1 wherein the second polymer is a perfluorosulfonic acid polymer.
7. The polymer blend of claim 1 wherein the second polymer comprises the following repeat unit:

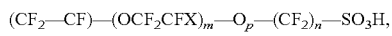

wherein:
X is fluorine or trifluoromethyl;
m is 0 to 3,
n is 1 to 12; and
p is 0 or 1.
8. The polymer blend of claim 1 wherein the second polymer comprises the following repeat unit:

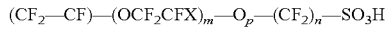

wherein m=1, X=CF$_3$, p=1, and n=2.

9. The polymer blend of claim 8 wherein the second polymer comprises the following repeat unit:

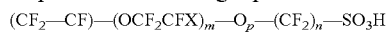

wherein m=0, p=1, and n=2.

10. The polymer blend of claim 8 wherein the second polymer comprises the following repeat unit:

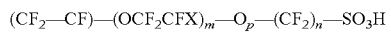

wherein m=0, p=1, and n=4.

11. The polymer blend of claim 1 wherein the first polymer is present in an amount from about 1 to about 80 weight percent.

12. The polymer blend of claim 1 wherein the first polymer is present in an amount from about 5 to about 50 weight percent.

13. The polymer blend of claim 1 wherein the first polymer is present in an amount from about 10 to about 30 weight percent.

14. The polymer blend of claim 1 wherein the second polymer is present in an amount from about 50 to about 95 weight percent.

15. The polymer blend of claim 1 wherein the second polymer is present in an amount from about 70 to about 90 weight percent.

16. The polymer blend of claim 1 wherein the second polymer is present in an amount from about 20 to about 99 weight percent.

* * * * *